(12) United States Patent
Asserhall

(10) Patent No.: US 7,996,649 B1
(45) Date of Patent: Aug. 9, 2011

(54) TRANSLATION LOOK-ASIDE BUFFER WITH LOOK-UP OPTIMIZED FOR PROGRAMMABLE LOGIC RESOURCE UTILIZATION

(75) Inventor: Stefan Asserhall, Gothenburg (SE)

(73) Assignee: Xilinx, Inc., San Jose, CA (US)

( * ) Notice: Subject to any disclaimer, the term of this patent is extended or adjusted under 35 U.S.C. 154(b) by 627 days.

(21) Appl. No.: 12/111,823

(22) Filed: Apr. 29, 2008

(51) Int. Cl.
*G06F 12/10* (2006.01)

(52) U.S. Cl. .................. 711/206; 711/207; 711/149

(58) Field of Classification Search .................. None
See application file for complete search history.

(56) References Cited

U.S. PATENT DOCUMENTS

| | | | | |
|---|---|---|---|---|
| 5,943,284 A | * | 8/1999 | Mizuno et al. | 365/230.03 |
| 6,484,248 B1 | * | 11/2002 | Wen | 711/202 |
| 2002/0018359 A1 | * | 2/2002 | Mizuno et al. | 365/154 |

* cited by examiner

*Primary Examiner* — Than Nguyen
(74) *Attorney, Agent, or Firm* — Kevin T. Cuenot; Thomas George

(57) ABSTRACT

A dual-port block random access memory (BRAM) can include first and second sections including direct mapped cache entries. The dual-port BRAM further can include third and fourth sections including translation look-aside buffer entries, wherein entries of the third section are associated with entries of the fourth section and wherein an entry of the third section and an associated entry of the fourth section collectively specify complete translation look-aside buffer data. The dual-port BRAM also can include first and second address ports concurrently accessing at least one of the first, second, third, or fourth sections of the dual-port BRAM to locate a virtual address to be translated.

20 Claims, 2 Drawing Sheets

TRANSLATION LOOK-ASIDE BUFFER WITH LOOK-UP OPTIMIZED FOR PROGRAMMABLE LOGIC RESOURCE UTILIZATION

FIELD OF THE INVENTION

The embodiments disclosed herein relate to integrated circuit devices (ICs). More particularly, the embodiments relate to implementing a translation look-aside buffer within a programmable IC.

BACKGROUND

Virtual memory refers to a technique that is used within many modern computer systems to provide more usable memory to application programs. Each application program operates as if it has access to a large portion of continuous computer memory, e.g., random access memory (RAM). This means that the physical memory used by an application program may be fragmented and/or overflow onto disk storage. The application program, however, acts as if it is accessing a continuous collection of memory addresses. Virtual memory also allows each executing application program to function as if it has access to the entirety of the physical memory of the host computer at any given time, despite having access to only a portion of the physical memory.

Implementation of virtual memory requires hardware components that aid the central processing unit (CPU) in translating virtual memory addresses (virtual addresses) utilized by the application program into physical memory addresses (physical addresses) used by the hardware to read and write to memory on behalf of the application program. A memory management unit (MMU) is a portion of hardware or circuitry that is tasked with translating virtual addresses to physical addresses. The MMU handles memory accesses that are requested by the CPU.

A translation look-aside buffer (TLB) is a cache that is used by the memory management hardware in serving memory access requests from the CPU. The TLB is incorporated to improve the speed of virtual address translation. The TLB includes a plurality of entries that map virtual addresses onto physical addresses. A TLB generally is implemented using a content addressable memory (CAM). Unlike a RAM where a memory address is supplied, a CAM receives a virtual address and searches the entire CAM contents for the virtual address. If an entry matches the virtual address, the physical address onto which the virtual address is mapped, as specified in the entry, is returned or output. If the specified virtual address is not found within the CAM, an exception can be generated which causes the virtual address to be looked up using another resource, e.g., a page table.

Programmable integrated circuits (ICs) are a well-known type of IC that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay locked loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmatically interconnects the various elements on the device. These programmable ICs are known as mask programmable devices. Programmable ICs can also be implemented in other ways, e.g., using fuse or antifuse technology. The phrase "programmable IC" includes but is not limited to these exemplary devices, as well as encompassing devices that are only partially programmable. For example, one type of programmable IC includes a combination of hard-coded transistor logic and a programmable switch fabric that programmatically interconnects the hard-coded transistor logic.

While CAMs may be used within application specific integrated circuits (ASICs), CAMs generally are not available within programmable ICs. Further, when implementing soft processors within a programmable IC, e.g., a processor formed by programming the fabric of the programmable IC to implement a CPU, a CAM is not an available option for implementing a TLB for that processor.

SUMMARY

The embodiments disclosed herein relate to implementing a translation look-aside buffer (TLB) within a programmable integrated circuit (IC). One embodiment of the present invention can include a dual-port block random access memory (BRAM). The dual-port BRAM can include first and second sections including direct mapped cache entries. The dual-port BRAM further can include third and fourth sections including translation look-aside buffer entries. The entries within the third section can be associated with entries within the fourth section. An entry within the third section and an associated entry within the fourth section collectively can specify complete translation look-aside buffer data. The dual-port BRAM also can include first and second address ports concurrently accessing at least one of the first, second, third, or fourth sections of the dual-port BRAM to locate a virtual address to be translated.

The first address port can access the first section and the second address port can concurrently access the second section to locate at least one direct mapped cache entry according to the virtual address to be translated. The first address port and the second address port each can search different entries within the third section of the dual-port BRAM concurrently. In one embodiment, the dual-port BRAM can be disposed within a programmable IC.

The first address port can locate a first direct mapped cache entry within the first section according to first selected bits from the virtual address to be translated. The second address port can, concurrently with the first address port, locate a second direct mapped cache entry within the second section according to second selected bits from the virtual address to be translated.

When a selected direct mapped cache entry matching the virtual address to be translated is located, an index can be determined from the matched direct mapped cache entry. In that case, the first address port can read a first portion of the translation look-aside buffer data from an entry within the third section located using the index from the selected direct mapped cache entry. Additionally, the second address port can, concurrently with the first address port, read a second portion of the translation look-aside buffer data from an entry within the fourth section located using the index from the selected direct mapped cache entry.

The dual-port BRAM can include a first data port outputting the first portion of the translation look-aside buffer data from an entry within the third section associated with the virtual address to be translated. The dual-port BRAM also can include a second data port, concurrently with the first data port, outputting the second portion of the translation look-aside buffer data from the entry within the fourth section associated with the entry within the third section.

When no direct mapped cache entry within either the first section or the second section matching the virtual address is located, the first address port can search selected entries within the third section for an entry matching the virtual address to be translated. The second address port, concurrently with the first address port, can search non-selected entries within the third section not searched by the first data port for an entry matching the virtual address to be translated.

For example, the first address port can search entries within the third section having odd addresses for an entry matching the virtual address to be translated, and the second address port, concurrently with the first address port, can search entries within the third section having even addresses for an entry matching the virtual address.

In another example, the first address port can search entries within the third section having even addresses for an entry matching the virtual address to be translated and the second address port, concurrently with the first address port, can search entries within the third section having odd addresses for an entry matching the virtual address to be translated.

Another embodiment of the present invention can include a method of translating virtual addresses into physical addresses using a dual-port BRAM. The method may be performed within a programmable IC, for example. The method can include concurrently locating within a first section and a second section of the dual-port BRAM, first and second direct mapped cache entries, respectively. When at least one of the first and second direct mapped cache entries matches a virtual address to be translated, a first portion of translation look-aside buffer data determined from an entry within a third section of the dual-port BRAM that is indicated by the direct mapped cache entry matching the virtual address and second portion of the translation look-aside buffer data from a corresponding entry within a fourth section of the dual-port BRAM can be output.

When none of the direct mapped cache entries match the virtual address to be translated, selected entries within the third section can be searched using a first address port of the dual-port BRAM for an entry matching the virtual address. Concurrently, non-selected entries within the third section can be searched using a second address port of the dual-port BRAM for an entry matching the virtual address.

The method can include selectively outputting either the first portion of the translation look-aside buffer data and the second portion of the translation look-aside buffer data, or an indication that an exception occurred, according to whether a direct mapped cache entry or an entry within the third section matches the virtual address.

Concurrently locating within a first section and a second section of the dual-port BRAM first and second direct mapped cache entries, respectively can include locating a first direct mapped cache entry within the first section according to first selected bits from the virtual address to be translated using the first address port of the dual-port BRAM, and locating a second direct mapped cache entry within the second section, concurrently with locating the first direct mapped cache entry within the first section, according to second selected bits from the virtual address to be translated using the second address port of the dual-port BRAM.

When at least one of the first and second direct mapped cache entries matches the virtual address to be translated, outputting can include, using the first address port of the dual-port BRAM, reading the first portion of the translation look-aside buffer data from the entry within the third section and, using the second address port of the dual-port BRAM, reading, concurrently with the first address port, the second portion of the translation look-aside buffer data from the entry within the fourth section. Outputting also can include outputting, from a first data port of the dual-port BRAM, the first portion of the translation look-aside buffer data from the entry within the third section. From a second data port of the dual-port BRAM, and concurrently with the first data port, the second portion of the translation look-aside buffer data from the entry within the fourth section can be output.

Where none of the direct mapped cache entries match the virtual address to be translated, the method can include outputting, from a first data port of the dual-port BRAM, the first portion of the translation look-aside buffer data from the entry within the third section that includes a virtual address matching the virtual address to be translated. From a second data port of the dual-port BRAM, concurrently with outputting from the first data port, the second portion of the translation look-aside buffer data from the entry within the fourth section that includes a physical address to which the virtual address to be translated is mapped can be output.

Yet another embodiment of the present invention can include a computer program product including a computer-usable medium having computer-usable program code that, when loaded within a programmable IC or processed by an information processing system, programs the programmable IC to implement the structures disclosed herein and/or perform the various steps and/or functions disclosed herein.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the invention.

The embodiments disclosed herein relate to implementing a translation look-aside buffer (TLB) within a programmable integrated circuit (IC). A TLB can be implemented within a programmable IC, for example, using a dual-port block random access memory (BRAM). The programmable IC, including the dual-port BRAM, can be programmed to operate in a manner that is optimized in terms of the programmable IC and/or the dual-port BRAM. The dual-port BRAM can be configured so that both ports, whether the address ports or the data ports, can work concurrently to perform functions such as searching the contents of the dual-port BRAM and/or outputting data from the dual-port BRAM. Accordingly, the speed of operation of the TLB implementation using a dual-port BRAM can be increased while keeping resource usage of the programmable IC low.

Figure 1:
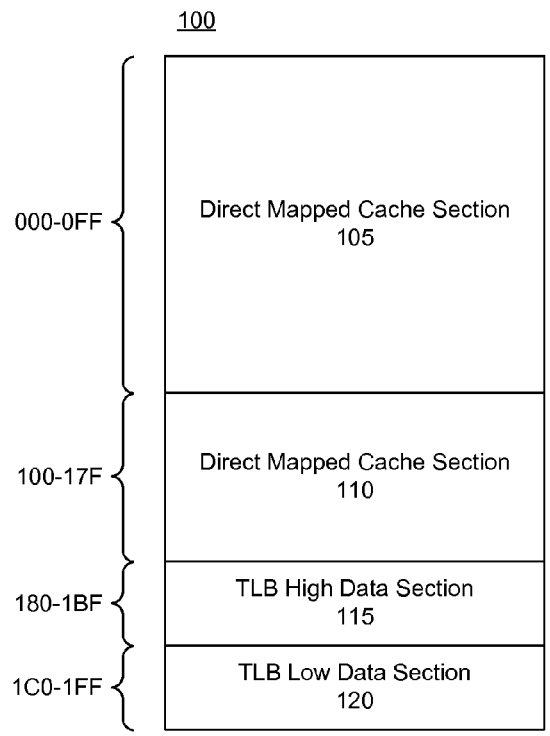
FIG. 1 is a first block diagram illustrating a dual-port block random access memory in accordance with one embodiment of the present invention.

FIG. 1 is a first block diagram illustrating a dual-port BRAM (hereafter "BRAM") 100 in accordance with one embodiment of the present invention. More particularly, FIG. 1 illustrates an exemplary organization of BRAM 100 in implementing a TLB. In one embodiment, BRAM 100 can be implemented as a BRAM such as those available within a Virtex®-type of field programmable gate array (FPGA) which is commercially available from Xilinx, Inc. of San Jose, Calif. Virtex-5 BRAMs, for example, are described in pages 111-169 of the document entitled "Virtex-5 FPGA User Guide," published Sep. 7, 2007, which is available from Xilinx, Inc., which pages are incorporated herein by reference. Xilinx® and Virtex are trademarks of Xilinx, Inc. in the United States, other countries, or both. However, the organization shown in FIG. 1 is not limited to Virtex-5 BRAMs, and can be used with any suitable dual-port BRAM.

As shown, BRAM 100 can be divided into four different sections including a direct mapped cache section 105, a direct mapped cache section 110, a TLB high data section 115, and a TLB low data section 120. Direct mapped cache sections 105 and 110, as their names suggest, are used as direct mapped caches. Direct mapped cache sections 105 and 110 implement cache memories that facilitate faster processing times when determining whether BRAM 100 includes an entry for translating a given virtual address into a physical address. Like numbers will be used to refer to the same components throughout this specification.

Each of direct mapped cache sections 105 and 110 can include a plurality of entries. Each of the entries can be directly accessed using a portion of a virtual address provided to BRAM 100 for translation. As such, each entry within sections 105 and 110 can include a virtual address, or portion thereof, and a value that can be used to index into TLB high data section 115 and TLB low data section 120.

In one embodiment, direct mapped cache section 105 can be sized to include 256 entries, each 36 bits in width. Direct mapped cache section 110 can be sized to include 128 entries, each also 36 bits in width. Eight bits are needed to index into any of the 256 possible entries of direct mapped cache section 105. Seven bits are needed to index into any of the 128 possible entries of direct mapped cache section 110. Accordingly, when a virtual address is received by the BRAM 100, any eight consecutive bits from the virtual address can be used to index into direct mapped cache section 105. Any seven consecutive bits from the same virtual address can be used to index into direct mapped cache section 110. It should be appreciated that the same eight bit positions or same seven bit positions, as the case may be, will be extracted from each virtual address for purposes of addressing into the direct mapped cache section 105 and direct mapped cache section 110 respectively. For example, if bits 0-7 are used as the eight bits, bits 0-7 of each virtual address will be used as the address to index into the direct mapped cache section 105. Alternatively, bits 1-8 may be used, bits 2-9 may be used, etc.

The eight bits used to index into direct mapped cache section 105 need not be the same as, or overlap with, the seven bits used as an address to index into direct mapped cache section 110. If so desired, however, the bits used to index into each of direct mapped cache sections 105 and 110 may overlap. It should be appreciated that the bits selected from, for example, a 32 bit virtual address can be those most likely to result in hits, e.g., those most utilized by the application program being executed.

In any case, a virtual address can be presented to BRAM 100 to determine whether BRAM 100 includes an entry that maps the received virtual address onto a physical address. From a virtual address presented to BRAM 100, eight bits can be extracted and used to index into direct mapped cache section 105. The eight bits specify an address between, for example, 000 and 0FF, and thus, indicate an entry in direct mapped cache section 105 having that address. The lookup operation can be performed by a first address port of BRAM 100.

Concurrently with the lookup operation into direct mapped cache section 105, the seven bits needed to index into the direct mapped cache section 110 can be extracted from the same virtual address. The seven bits will specify an address between, for example, 100 and 17F. Thus, the seven bits specify an entry within the direct mapped cache section 110 having that address. The lookup operation can be performed by a second address port of BRAM 100.

The virtual address stored within the entry located within direct mapped cache section 105 and the virtual address stored within the entry located within direct mapped cache section 110 can be compared with the provided virtual address, e.g., the virtual address requiring translation. If a match occurs, the entry specifying the matching virtual address, whether from direct mapped cache section 105 or direct mapped cache section 110, or both, will also specify an index value that can be used to index into both TLB high data section 115 and TLB low data section 120.

Consider the case where a 32 bit virtual address is to be translated. Since seven or eight bits of that address will be implicitly specified by virtue of the address of the entry looked up within either the direct mapped cache section 105 or 110, each entry in the direct mapped cache sections 105 and 110 need only specify the remaining 24 or 25 bits of the virtual address. This means that each 36 bit entry can specify a complete virtual address, when considered collectively with the address of the entry itself, as well as a pointer or index value to be used to reference TLB high data section 115 and TLB low data section 120.

TLB high data section 115 and TLB low data section 120 can store TLB data. More particularly, each entry of TLB high data section 115 can specify a virtual address and a page size. Each entry of TLB low data section 120 can specify the physical address onto which the virtual address maps and one or more protection bits. TLB high data section 115 and TLB low data section 120 each can include 64 entries, where each entry is 36 bits in width.

An entry within TLB high data section 115 and a corresponding, or associated, entry within TLB low data section 120 are both needed to specify a complete set of TLB data for translation of a virtual address. In illustration, if a match is determined in one of direct mapped cache sections 105 and/or 110, and the index value into TLB high data section 115 and TLB low data section 120 is 0, then the entry located at address 180 (a zero offset from the beginning address of TLB high data section 115) can be accessed. Similarly, the entry located at address 100 (a zero offset from the beginning address of TLB low data section 120) can be accessed. The entry at address 180 of the TLB high data section 115 can specify the virtual address and the page size. The entry at address 100 within TLB low data section 120 is associated with the entry at address 180. The entry at 100 can complete the TLB data for the entry at address 180 by specifying the physical address onto which the virtual address maps and various protection and/or administration bits.

By breaking the TLB data into TLB high data section 115 and TLB low data section 120, the two address ports of BRAM 100 can be used to concurrently read or access the TLB data. A first address port of BRAM 100 can read the entry at address 180 within TLB high data section 115. A second address port of BRAM 100 can read the entry at address 100 of TLB low data section 120.

Further, data ports of the BRAM 100 can be used simultaneously to read TLB data out of the BRAM 100. More particularly, a first data port can output TLB data read from the entry at address 180 in TLB high data section 115. A second data port can be used to output TLB data read from address 100 from TLB low data section 120. Thus, 72 bits of TLB data can be output via two ports rather than outputting 36 bits of TLB data from one port and subsequently outputting another 36 bits of TLB data from the same port. As used herein, "outputting" and/or "output" can mean, for example, reading data from a memory, writing data to a memory, sending or transmitting data to another system or component, or the like.

The particular BRAM disclosed herein has been used for purposes of illustration only and is not intended to limit the present invention. Those skilled in the art will recognize that the various sizes in terms of entries and bits disclosed herein depend upon the size of BRAM 100 and may vary from one hardware implementation to another based upon the underlying BRAM circuitry. Further different varieties of BRAMs may be used in different models and/or types of programmable ICs.

Figure 2:
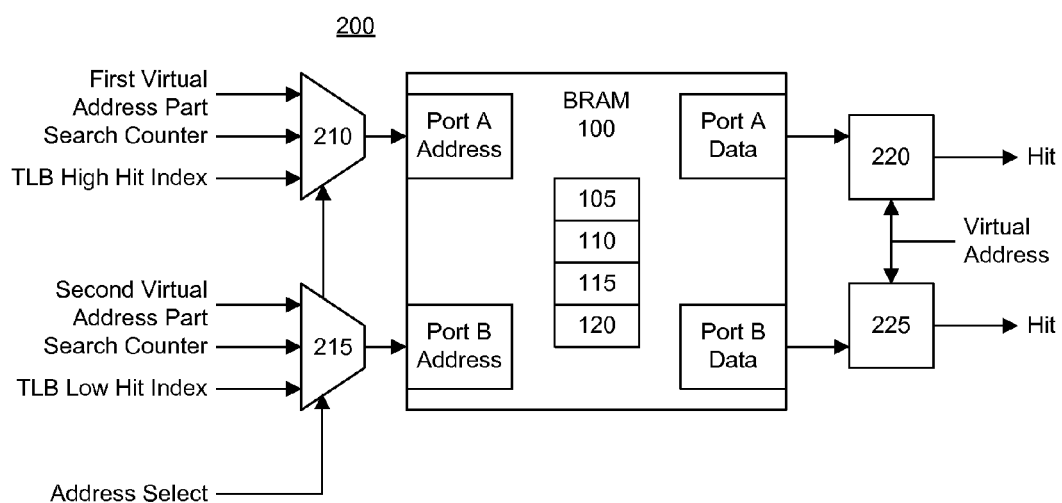
FIG. 2 is a second block diagram illustrating a translation look-aside buffer implementation within a programmable integrated circuit in accordance with another embodiment of the present invention.

FIG. 2 is a second block diagram illustrating a TLB implementation 200 within a programmable IC in accordance with another embodiment of the present invention. FIG. 2 illustrates the operation of BRAM 100 as described with reference to FIG. 1, in conjunction with surrounding control circuitry. As shown, the BRAM 100 can include two address ports referred to as Port A Address and Port B Address. The BRAM 100 also can include two data ports referred to as Port A Data and Port B Data. Multiplexers 210 and 215 also are included as well as comparators 220 and 225, coupled together and to each other as shown in FIG. 2.

In operation, a first portion of a virtual address to be translated can be provided to the multiplexer 210 and Port A address via the first virtual address part signal. The first portion of the virtual address can refer, for example, to the bits (e.g., eight bits) needed to specify an address to index into the direct mapped cache section 105. The address select signal can instruct multiplexer 210 to pass the first portion of the virtual address to Port A Address. Port A Address can index into direct mapped cache section 105 to the entry having an address matching the eight bits taken from the virtual address to be translated, e.g., the first portion of the virtual address. The virtual address specified by the entry located within direct mapped cache section 105 can be output to comparator 220 via Port A Data to be compared with the entire virtual address to determine whether a hit has occurred. That is, the portion of the virtual address specified by the entry within direct mapped cache section 105 can be combined with the first portion of the virtual address used to locate the entry to form a complete virtual address for comparison. The complete virtual address output from Port A Data can be compared with the virtual address for which translation to a physical address is needed to determine whether the two match.

Concurrently with Port A Address receiving the eight bit address, a second portion of the same virtual address, e.g., seven bits, can be provided to multiplexer 215 and Port B Address via the second virtual address part signal. The address select signal can instruct multiplexer 215 to pass the seven bit address, e.g., the second portion of the virtual address, to Port B Address. Port B Address can index into direct mapped cache section 110 to the entry having an address matching the seven bits taken from the virtual address to be translated. The virtual address specified by the entry located in direct mapped cache section 110 can be output to comparator 225 via Port B Data to be compared with the entire virtual address to determine whether a hit has occurred. As noted, the portion of the virtual address specified by the entry within direct mapped cache section 110 can be combined with the second portion of the virtual address to form the complete virtual address for comparison. The complete virtual address can be output by Port B Data.

Port B Data can output the virtual address specified by the entry within the directed mapped cache section 110, e.g., the complete virtual address, located using the seven bit address simultaneously with Port A Data outputting the virtual address specified by the entry within the direct mapped cache section 105, e.g., the complete virtual address, located using the eight bit address. Output signals from each of comparators 220 and 225 indicate whether a hit has occurred. It should be appreciated that both comparators 220 and 225 may encounter a hit. In that case, each of the direct mapped cache sections 105 and 110 may include an entry that points to the same entry in TLB high data section 115 (and thus TLB low data section 120).

The TLB high hit index signal provided to multiplexer 210 can indicate an index value, or offset, to be used to locate an entry within TLB high data section 115. Similarly, the TLB low hit index signal provided to multiplexer 215 can indicate an index value to be used in locating an entry within TLB low data section 120. These signals can be updated each clock cycle to reflect the index value extracted from any entry of the direct mapped cache sections 105 and/or 110 that is considered a hit during the previous clock cycle and which is output by either, or both, of Port A Data or Port B Data. The address select line can instruct each of multiplexers 210 and 215 to pass the TLB high hit index signal and TLB low hit index signal to Port A Address and Port B Address respectively.

It should be appreciated that because the TLB high data section 115 and TLB low data section 120 of BRAM 100 are read together to provide complete TLB data, the index provided to Port A Address and Port B Address will be the same. For example, assume that a hit has occurred and the index to be used to access TLB data from TLB high data section 115 and TLB low data section 120 is four. Upon determining a hit in clock cycle "N" and outputting the index value from one or both of Port A data or Port B data in clock cycle "N+1," Port A Address can be provided the index of four causing Port A Address to locate the fifth entry in the TLB high data section 115, e.g., the entry having an address of base address (180) plus the offset (4). Also during clock cycle N+1, Port B Address can be provided an index of four causing Port B Address to locate the fifth entry in the TLB low data section 120, e.g., the entry having an address of the base address (1C0) plus the offset. Port A Address can operate concurrently with Port B Address.

A first portion of TLB data read from the fifth entry of TLB high data section 115 can be output via Port A Data. Concurrently with the first portion of the TLB data being output from Port A Data, a second portion of the TLB data read from the fifth entry in TLB low data section 120 can be output from Port B Data. Thus, when a hit occurs, complete TLB data can be located and output in two clock cycles.

Port A Address and Port B Address can be used concurrently to implement a search of BRAM 100 in the event that a direct hit is not determined from either of direct mapped cache section 105 or direct mapped cache section 110. Further detail regarding the operation of BRAM 100 in terms of a TLB implementation will be described with reference to FIG. 3, including search functions that can be implemented when a miss occurs with respect to the direct mapped caches 105 and 110.

When none of the direct mapped cache entries match the virtual address to be translated, the address select signal can instruct multiplexer 210 to use the search counter signal provided thereto to index into the TLB high data section 115 to perform a search of one set of entries. Simultaneously, the address select signal can instruct multiplexer 215 to use the search counter signal provided thereto to index into the TLB high data section 115 to perform a search of another set of entries. The search counter signals can indicate the value of the search counter, which can be incremented appropriately during the search until a hit occurs or the search ends without finding the virtual address.

In one embodiment, a search counter (not shown) may be included for Port A Address and another for Port B Address. For example, a first search counter can provide even addresses to one port while a second search counter can provide odd address to the other port. Alternatively, a single counter can be used to provide addresses to both Port A Address and Port B Address. In that case, additional logic may be included to adjust the search counter signals provided to each of multiplexers 210 and 215 so as to reflect odd or even values, and thus addresses, as appropriate.

Figure 3:
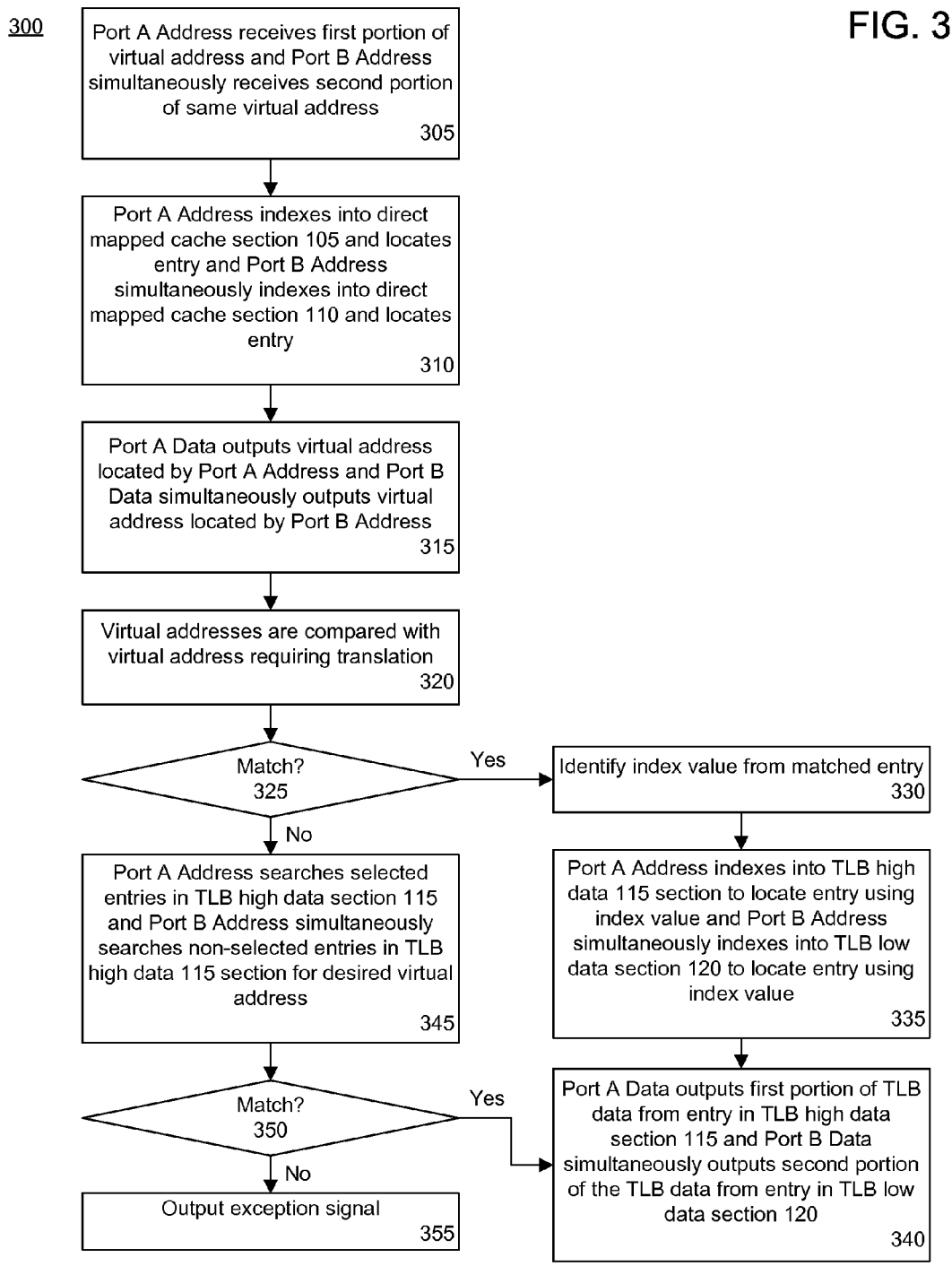
FIG. 3 is a flow chart illustrating a method of translating virtual addresses into physical addresses in accordance with another embodiment of the present invention.

FIG. 3 is a flow chart illustrating a method 300 of translating virtual addresses into physical addresses in accordance with another embodiment of the present invention. The method 300 can be performed using a BRAM as described with reference to FIGS. 1 and 2. For example, a BRAM as described with reference to FIGS. 1 and 2 can be implemented within a programmable IC and used to implement a TLB that may be used with a processor embedded within the programmable IC, whether a hard processor or a soft processor. As known, a soft processor refers to a processor implemented by programming the fabric of a programmable IC as opposed to a hard processor which refers to a dedicated processor disposed upon or within the fabric of a programmable IC.

Method 300 can begin in a state where a virtual address has been identified for which translation to a physical address is needed. Accordingly, in step 305, a first portion of the virtual address can be provided to Port A Address and a second portion of the same virtual address can be provided to Port B Address. As noted, eight bits of the virtual address can be provided to Port A Address as the first portion and seven bits of the virtual address can be provided to Port B Address as the second portion. The two portions of the virtual address may or may not overlap. The first portion of the virtual address can be provided to Port A Address and the second portion of the virtual address can be provided to Port B Address concurrently, or simultaneously.

In step 310, Port A Address can index into direct mapped cache section 105 using the first portion of the virtual address provided, e.g., the eight bits, and locate the entry having the address specified by the eight bits. Simultaneously, Port B Address can index into direct mapped cache section 110 using the second portion of the virtual address provided, e.g., the seven bits, and locate the entry having the address specified by the seven bits.

In step 315, Port A Data can output the virtual address specified by the entry located by Port A Address within direct mapped cache section 105 from step 310. Simultaneously, Port B Data can output the virtual address specified by the entry located by Port B Address within direct mapped cache section 110 from step 310. As noted, the virtual address that is output for comparison can be constructed from any portion of the virtual address specified in a direct mapped cache entry and the portion of the virtual address used to locate that direct mapped cache entry. In step 320, each virtual address that is output can be compared with the virtual address for which translation is required. For example, Port A Data can output the virtual address specified by the entry in direct mapped cache section 105. That virtual address can be compared with the virtual address requiring translation. Concurrently, Port B Data can output the virtual address specified by the entry in direct mapped cache section 110. That virtual address can be compared with the virtual address requiring translation.

In step 325, a determination can be made as to whether one or both of the virtual addresses read from the direct mapped cache sections 105 and 110 match the virtual address requiring translation, e.g., whether a "hit" occurred. If so, the method can proceed to step 330. If not, the method can continue to step 345.

In step 330, an index value that is specified within the matched entry, whether from direct mapped cache section 105, direct mapped cache section 110, or both, can be identified. In step 335, Port A Address can index into TLB high data section 115 using the index value to locate the desired entry. Simultaneously, Port B Address can index into TLB low data section 120 using the index value to locate the desired entry. As noted, the same index value will be used to index into both TLB high data section 115 and TLB low data section 120.

In step 340, the TLB data read from the entry within TLB high data section 115, referred to as the first portion of TLB data, can be output through Port A Data. Simultaneously, TLB data read from the entry within TLB low data section 120, referred to as the second portion of TLB data, can be output through Port B Data. Taken collectively, Port A Data and Port B Data can output 72 bits of TLB data. As noted, the first portion of the TLB data read from the entry in TLB high data section 115 can specify the virtual address and the page size. The second portion of the TLB data read from the entry in TLB low data section 120 can specify the physical address to which the virtual address has been mapped, as well as one or more protection and/or administrative bits. It should be appreciated that the particular data stored within TLB high data section 115 and TLB low data section 120 may be changed. For example, the entries of the TLB high data section 115 can specify the physical address to which the virtual address has been mapped, while the entries of the TLB low data section 120 can specify the virtual address and page size. In that case, the search strategy implemented in the case of a miss of the direct mapped cache entries would be modified to search the TLB low data section 120.

Continuing with step 345, in the case where no hit occurs within direct mapped cache sections 105 or 110, a search of TLB high data section 115 can be performed. Port A Address can search a set of selected entries in TLB high data section 115. Port B Address can concurrently search a different set of entries, e.g., non-selected entries, in TLB high data section 115. In one embodiment, the entries can be divided into those having even addresses and those having odd address. Entries with even addresses can be assigned to one port of the BRAM for searching. Entries with odd addresses can be assigned to the other port of the BRAM for searching.

In illustration, Port A Address can begin searching entries of the TLB high data section 115 having an even address for an entry specifying the virtual address for which translation is needed. At the same time, Port B Address can begin searching entries of TLB high data section 115 having an odd address for an entry specifying the virtual address for which translation is needed. In another example, Port A Address can begin searching entries of the TLB high data section 115 having an odd address while, at the same time, Port B Address can begin searching entries of the TLB high data section 115 having even addresses.

In step 350, a determination can be made as to whether a match was found. If so, the method can proceed to step 340 where the TLB data, including the translated physical address, can be output as described. If no match is found, e.g., no entry in the TLB high data section 115 specifies the virtual address for which translation is needed, the method can proceed to step 355 where an exception can be generated and/or output indicating that the BRAM does not have a translation, e.g., a physical address, for the virtual address requiring translation.

The embodiments disclosed herein provide a TLB architecture that utilizes a BRAM of a programmable IC. By utilizing the dual ports of the BRAM for purposes such as searching and lookup functions, the speed of the TLB can be increased to better support hard and soft processors that may also be implemented within the same programmable IC as the TLB.

Those skilled in the art will recognize that when entries are placed into the TLB high data section and the TLB low data section, corresponding entries must also be written into the appropriate direct mapped cache section of the BRAM. For example, when a virtual address translation is not found within the BRAM, an entry can be written into the address of the direct mapped cache section 105 specified by the eight bits extracted from the virtual address not found. Similarly, an entry will be written into the address of the direct mapped cache section 110 specified by the seven bits extracted from the same virtual address. Each entry within the direct mapped caches can include an index used to locate an entry in the TLB high data section 115 and a corresponding entry in the TLB low data section 120. The entry from the TLB high data section 115 and the entry from the TLB low data section 120, taken collectively, specify the translation information needed to translate the virtual address to a physical address. Thus, it may be the case that each direct mapped cache section 105 and 110 will include an entry that points to a same entry in the TLB high data section 115 (and TLB low data section 120), depending upon which set of bits of the virtual address is used to index into each respective direct mapped cache section 105 and 110.

As noted, the particular memory sizes and widths used herein have been used for purpose of illustration. As such, the examples provided are not intended to limit the embodiments of the present invention. Those skilled in the art will recognize that the particular size of the BRAM used will dictate the number of entries that may be stored within each respective section described herein.

The flowchart in the figure illustrates the architecture, functionality, and operation of possible implementations of systems, methods and computer program products according to various embodiments of the present invention. In this regard, each block in the flowchart may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code, e.g., hardware description language file(s), a netlist, or a bitstream, which, when loaded in a computer system or a programmable IC, causes the computer system to perform the functions described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library, hardware description language files, a bitstream, and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A dual-port block random access memory (BRAM), comprising:
    first and second sections comprising direct mapped cache entries;
    third and fourth sections comprising translation look-aside buffer entries, wherein entries within the third section are associated with entries within the fourth section, wherein an entry within the third section and an associated entry within the fourth section collectively specify complete translation look-aside buffer data; and
    first and second address ports concurrently accessing at least one of the first, second, third, or fourth sections of the dual-port BRAM to locate a virtual address to be translated.

2. The dual-port BRAM of claim 1, wherein the first address port accesses the first section and the second address port concurrently accesses the second section locating at least one direct mapped cache entry according to the virtual address to be translated.

3. The dual-port BRAM of claim 1, wherein the first address port and the second address port each search different entries within the third section of the dual-port BRAM concurrently.

4. The dual-port BRAM of claim 1, wherein the dual-port BRAM is disposed within a programmable integrated circuit.

5. The dual-port BRAM of claim 1, wherein:
    the first address port locates a first direct mapped cache entry within the first section according to first selected bits from the virtual address to be translated; and
    the second address port, concurrently with the first address port, locates a second direct mapped cache entry within the second section according to second selected bits from the virtual address to be translated.

6. The dual-port BRAM of claim 1, wherein a selected direct mapped cache entry matching the virtual address to be translated is located and comprises an index, wherein:
    the first address port reads a first portion of the translation look-aside buffer data from an entry within the third section located using the index from the selected direct mapped cache entry; and
    the second address port, concurrently with the first address port, reads a second portion of the translation look-aside buffer data from an entry within the fourth section located using the index from the selected direct mapped cache entry.

7. The dual-port BRAM of claim 1, further comprising:
    a first data port outputting a first portion of the translation look-aside buffer data from an entry within the third section associated with the virtual address to be translated; and
    a second data port, concurrently with the first data port, outputting a second portion of the translation look-aside buffer data from an entry within the fourth section associated with the entry of the third section.

8. The dual-port BRAM of claim 1, wherein no direct mapped cache entry within either the first section or the second section matching the virtual address is located, and wherein:
    the first address port searches selected ones of the entries within the third section for an entry matching the virtual address to be translated; and
    the second address port, concurrently with the first address port, searches non-selected entries within the third section not searched by the first data port for an entry matching the virtual address to be translated.

9. The dual-port BRAM of claim 1, wherein no direct mapped cache entry within either the first section or the second section matching the virtual address is located, and wherein:
    the first address port searches entries within the third section having odd addresses for an entry matching the virtual address to be translated; and
    the second address port, concurrently with the first address port, searches entries within the third section having even addresses for an entry matching the virtual address to be translated.

10. The dual-port BRAM of claim 1, wherein no direct mapped cache entry within either the first section or the second section matching the virtual address is located, and wherein:
    the first address port searches entries within the third section having even addresses for an entry matching the virtual address to be translated; and
    the second address port, concurrently with the first address port, searches entries within the third section having odd addresses for an entry matching the virtual address to be translated.

11. Within a programmable integrated circuit, a method of translating virtual addresses into physical addresses using a dual-port block random access memory (BRAM), the method comprising:
    concurrently locating within a first section and a second section of the dual-port BRAM first and second direct mapped cache entries, respectively;
    when at least one of the first and second direct mapped cache entries matches a virtual address to be translated, outputting a first portion of translation look-aside buffer data determined from an entry within a third section of the dual-port BRAM that is indicated by the direct mapped cache entry matching the virtual address and a second portion of the translation look-aside buffer data from a corresponding entry within a fourth section of the dual-port BRAM; and
    when none of the direct mapped cache entries match the virtual address to be translated, searching selected entries within the third section using a first address port of the dual-port BRAM for an entry matching the virtual address and concurrently searching non-selected entries within the third section using a second address port of the dual-port BRAM for an entry matching the virtual address.

12. The method of claim 11, further comprising selectively outputting either the first portion of the translation look-aside buffer data and the second portion of the translation look-aside buffer data, or an indication that an exception occurred, according to whether a direct mapped cache entry or an entry within the third section matches the virtual address.

13. The method of claim 11, wherein the concurrently locating within a first section and a second section of the dual-port BRAM first and second direct mapped cache entries, respectively comprises:
  locating a first direct mapped cache entry within the first section according to first selected bits from the virtual address to be translated using the first address port of the dual-port BRAM; and
  locating a second direct mapped cache entry within the second section, concurrently with locating the first direct mapped cache entry within the first section, according to second selected bits from the virtual address to be translated using the second address port of the dual-port BRAM.

14. The method of claim 11, wherein, when at least one of the first and second direct mapped cache entries matches the virtual address to be translated, the outputting a first portion of translation look-aside buffer data determined from an entry within a third section of the dual-port BRAM that is indicated by the direct mapped cache entry matching the virtual address and a second portion of the translation look-aside buffer data from a corresponding entry within a fourth section of the dual-port BRAM comprises:
  using the first address port of the dual-port BRAM, reading the first portion of the translation look-aside buffer data from the entry within the third section; and
  using the second address port of the dual-port BRAM, reading, concurrently with the first address port, the second portion of the translation look-aside buffer data from the entry within the fourth section.

15. The method of claim 14, wherein the outputting a first portion of translation look-aside buffer data determined from an entry within a third section of the dual-port BRAM that is indicated by the direct mapped cache entry matching the virtual address and a second portion of the translation look-aside buffer data from a corresponding entry within a fourth section of the dual-port BRAM further comprises:
  outputting, from a first data port of the dual-port BRAM, the first portion of the translation look-aside buffer data from the entry within the third section; and
  outputting, from a second data port of the dual-port BRAM, concurrently with outputting from the first data port, the second portion of the translation look-aside buffer data from the entry within the fourth section.

16. The method of claim 14, further comprising, when none of the direct mapped cache entries match the virtual address to be translated:
  outputting, from a first data port of the dual-port BRAM, the first portion of the translation look-aside buffer data from an entry within the third section that comprises a virtual address matching the virtual address to be translated; and
  outputting, from a second data port of the dual-port BRAM, concurrently with outputting from the first data port, the second portion of the translation look-aside buffer data from an entry within the fourth section that comprises a physical address to which the virtual address to be translated is mapped.

17. A computer program product, comprising:
  a non-transitory computer-usable medium having computer-usable program code that causes a programmable integrated circuit comprising a dual-port block random access memory (BRAM) to translate virtual addresses into physical addresses, the non-transitory computer-usable medium comprising:
    computer-usable program code that defines first and second sections of the dual-port BRAM to include direct mapped cache entries;
    computer-usable program code that defines third and fourth sections of the dual-port BRAM to include translation look-aside buffer entries, wherein entries within the third section are associated with entries within the fourth section, wherein an entry within the third section and an associated entry within the fourth section collectively specify complete translation look-aside buffer data; and
    computer-usable program code that causes a first and a second address port to access at least one of the first, second, third, or fourth sections of the dual-port BRAM concurrently to locate a virtual address to be translated.

18. The computer program product of claim 17, wherein the non-transitory computer-usable medium further comprises:
  computer-usable program code that causes the first address port to locate a first direct mapped cache entry within the first section according to first selected bits from the virtual address to be translated; and
  computer-usable program code that causes the second address port, concurrently with the first address port, to locate a second direct mapped cache entry within the second section according to second selected bits from the virtual address to be translated.

19. The computer program product of claim 17, wherein a selected direct mapped cache entry matching the virtual address to be translated is located and comprises an index, and wherein the non-transitory computer-usable medium further comprises:
  computer-usable program code that causes the first address port to read a first portion of the translation look-aside buffer data from an entry within the third section located using the index from the selected direct mapped cache entry;
  computer-usable program code that causes the second address port, concurrently with the first address port, to read a second portion of the translation look-aside buffer data from an entry within the fourth section located using the index from the selected direct mapped cache entry;
  computer-usable program code that causes a first data port to output the first portion of the translation look-aside buffer data from the entry within the third section located using the index from the selected direct mapped cache entry; and
  computer-usable program code that causes a second data port, concurrently with the first data port, to output the second portion of the translation look-aside buffer data from the entry within the fourth section located using the index from the selected direct mapped cache entry.

20. The computer program product of claim 17, wherein no direct mapped cache entry within either the first section or the second section matches the virtual address, and wherein the non-transitory computer-usable medium further comprises:
  computer-usable program code that causes the first address port to search selected entries within the third section for an entry matching the virtual address; and
  computer-usable program code that causes the second address port, concurrently with the first address port, to search non-selected entries within the third section not searched by the first address port for an entry matching the virtual address.

* * * * *